(12) United States Patent
Nunley

(10) Patent No.: US 9,004,507 B1
(45) Date of Patent: Apr. 14, 2015

(54) BOAT DOLLY SYSTEM

(71) Applicant: Terry Nunley, McMinnville, TN (US)

(72) Inventor: Terry Nunley, McMinnville, TN (US)

( * ) Notice: Subject to any disclaimer, the term of this patent is extended or adjusted under 35 U.S.C. 154(b) by 0 days.

(21) Appl. No.: 14/254,977

(22) Filed: Apr. 17, 2014

(51) Int. Cl.
  *B62B 1/00* (2006.01)
  *B63C 13/00* (2006.01)
  *B62B 1/26* (2006.01)
  *B62B 1/14* (2006.01)

(52) U.S. Cl.
  CPC . *B63C 13/00* (2013.01); *B62B 1/26* (2013.01); *B62B 1/14* (2013.01)

(58) Field of Classification Search
  CPC .......................................................... B62B 1/04
  USPC ................... 280/47.17, 47.32, 414.2, 47.331, 280/638–639, 651, 414.1, 47.131, 63; 114/347
  See application file for complete search history.

(56) References Cited

U.S. PATENT DOCUMENTS

| | | | | |
|---|---|---|---|---|
| 3,455,473 | A | * | 7/1969 | Parker ............................ 414/536 |
| 4,465,291 | A | | 8/1984 | Wylie et al. |
| D302,065 | S | | 7/1989 | Weale |
| 4,850,605 | A | * | 7/1989 | Ray .......................... 280/47.331 |
| 5,072,959 | A | | 12/1991 | Marullo |
| 5,158,032 | A | | 10/1992 | Pitts |
| 5,348,327 | A | | 9/1994 | Gieske |
| 6,032,964 | A | * | 3/2000 | Capobianco ............. 280/47.331 |
| 6,142,492 | A | | 11/2000 | DeLucia |
| 6,926,292 | B1 | | 8/2005 | Weeks |
| 7,641,205 | B2 | | 1/2010 | Privette |

FOREIGN PATENT DOCUMENTS

| | | |
|---|---|---|
| AU | 2011354492 B2 | 10/2013 |
| CA | 2267604 | 7/2003 |
| WO | WO0040447 | 8/2000 |

OTHER PUBLICATIONS

Title of Source: www.cabelas.com Product Name: Boat Dolly.

* cited by examiner

*Primary Examiner* — John Walters
*Assistant Examiner* — James Triggs

(57) ABSTRACT

A boat dolly system facilitates transportation of a watercraft on land toward a fishing hole while protecting the bottom end of the watercraft from damage. The system includes a boat having a top end, a bottom end, a front end and a rear end. A pair of front straps is couplable to a front end of the boat and is extendable around the front end and a bottom end of the boat. A pair of rear straps is couplable to and extendable around a rear end of the boat. A lower rear mounting assembly includes at least one wheel and a lower mounting bracket. The at least one wheel of the lower rear mounting assembly is coupled to and extends downwardly from the lower mounting bracket. The lower mounting bracket is couplable to the bottom end of the boat. Each of the front straps and the rear straps is couplable to the lower mounting bracket.

14 Claims, 4 Drawing Sheets

BOAT DOLLY SYSTEM

BACKGROUND OF THE DISCLOSURE

Field of the Disclosure

The disclosure relates to dolly systems and more particularly pertains to a new dolly system for facilitating transportation of a watercraft on land toward a fishing hole while also protecting the bottom end of the watercraft from damage.

SUMMARY OF THE DISCLOSURE

An embodiment of the disclosure meets the needs presented above by generally comprising a boat having a top end, a bottom end, a front end and a rear end. A pair of front straps is couplable to a front end of the boat and is extendable around the front end and a bottom end of the boat. A pair of rear straps is couplable to and extendable around a rear end of the boat. A lower rear mounting assembly includes at least one wheel and a lower mounting bracket. The at least one wheel of the lower rear mounting assembly is coupled to and extends downwardly from the lower mounting bracket. The lower mounting bracket is couplable to the bottom end of the boat. Each of the front straps and the rear straps is couplable to the lower mounting bracket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
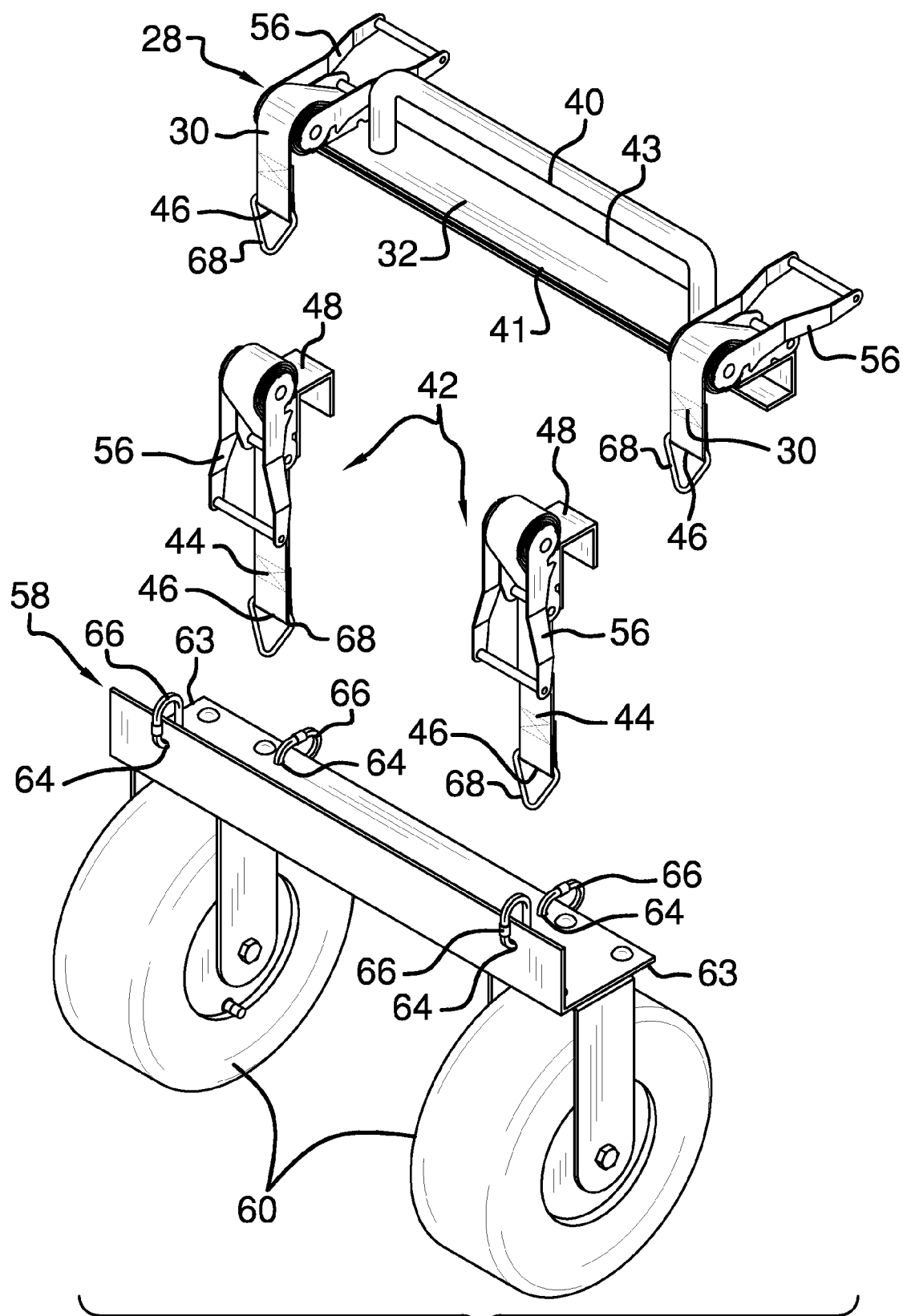
FIG. 1 is a top rear side perspective view of a boat dolly system according to an embodiment of the disclosure.

With reference now to the drawings, and in particular to FIGS. 1 through 5 thereof, a new dolly system embodying the principles and concepts of an embodiment of the disclosure and generally designated by the reference numeral 10 will be described.

Figure 2:
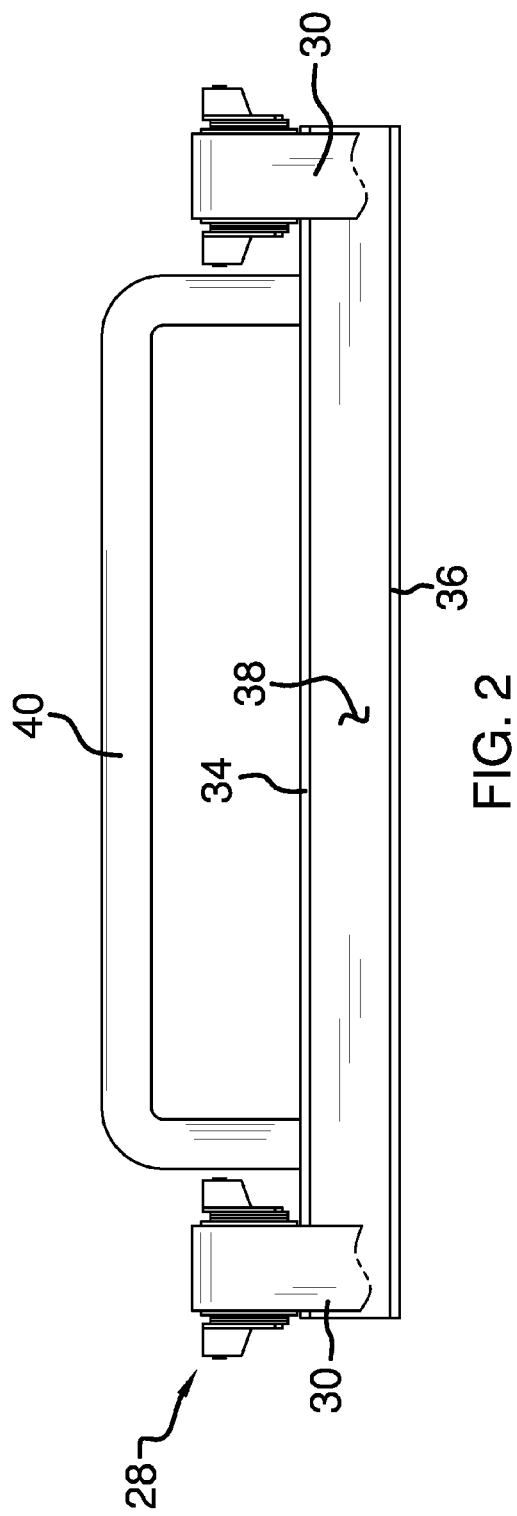
FIG. 2 is a rear view of a front mounting assembly of an embodiment of the disclosure.
Figure 3:
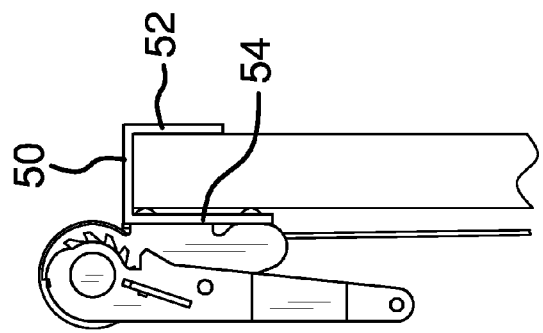
FIG. 3 is a side view of an upper rear mounting assembly of an embodiment of the disclosure.
Figure 4:
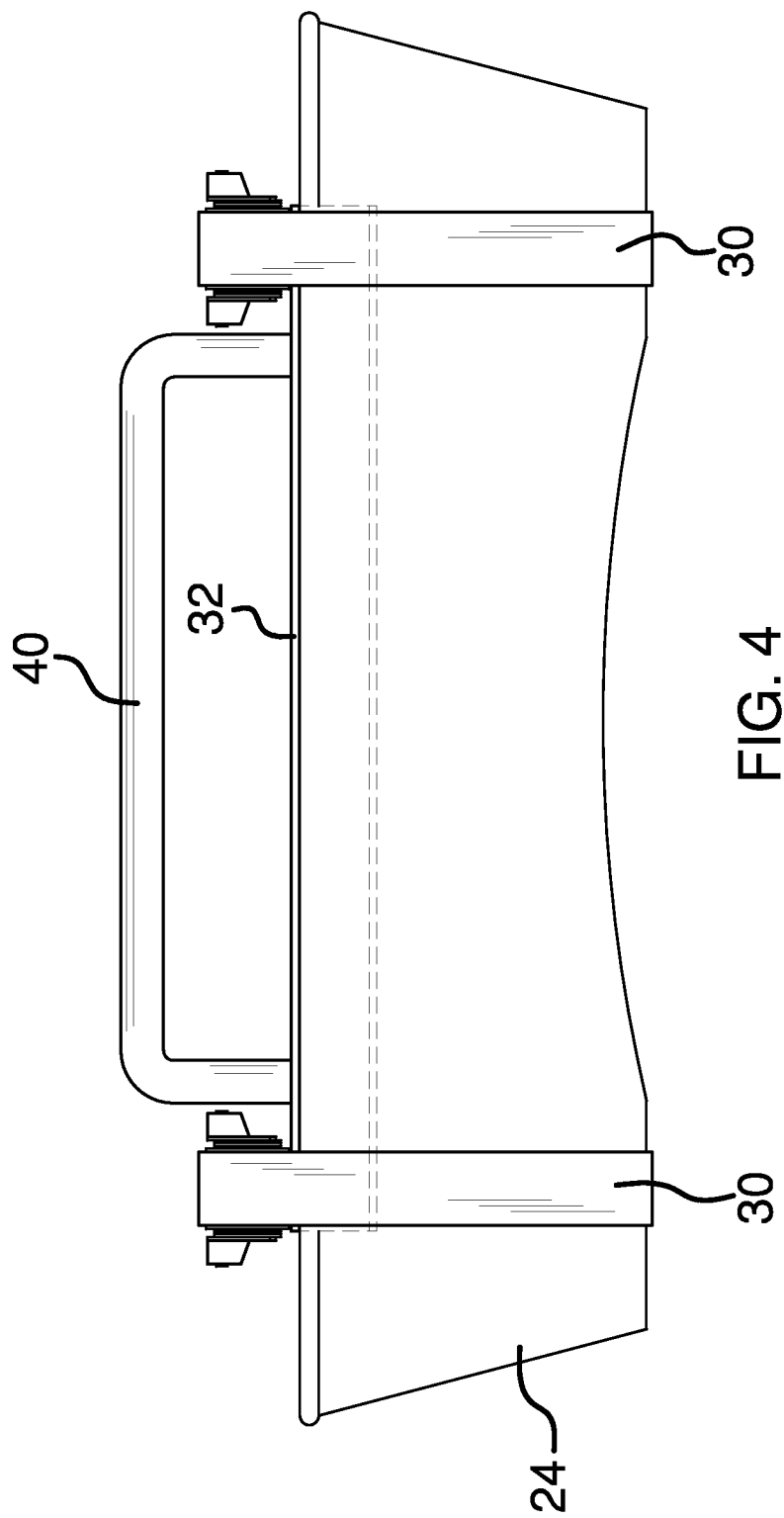
FIG. 4 is a front view of a front mounting assembly and a boat of an embodiment of the disclosure.
Figure 5:
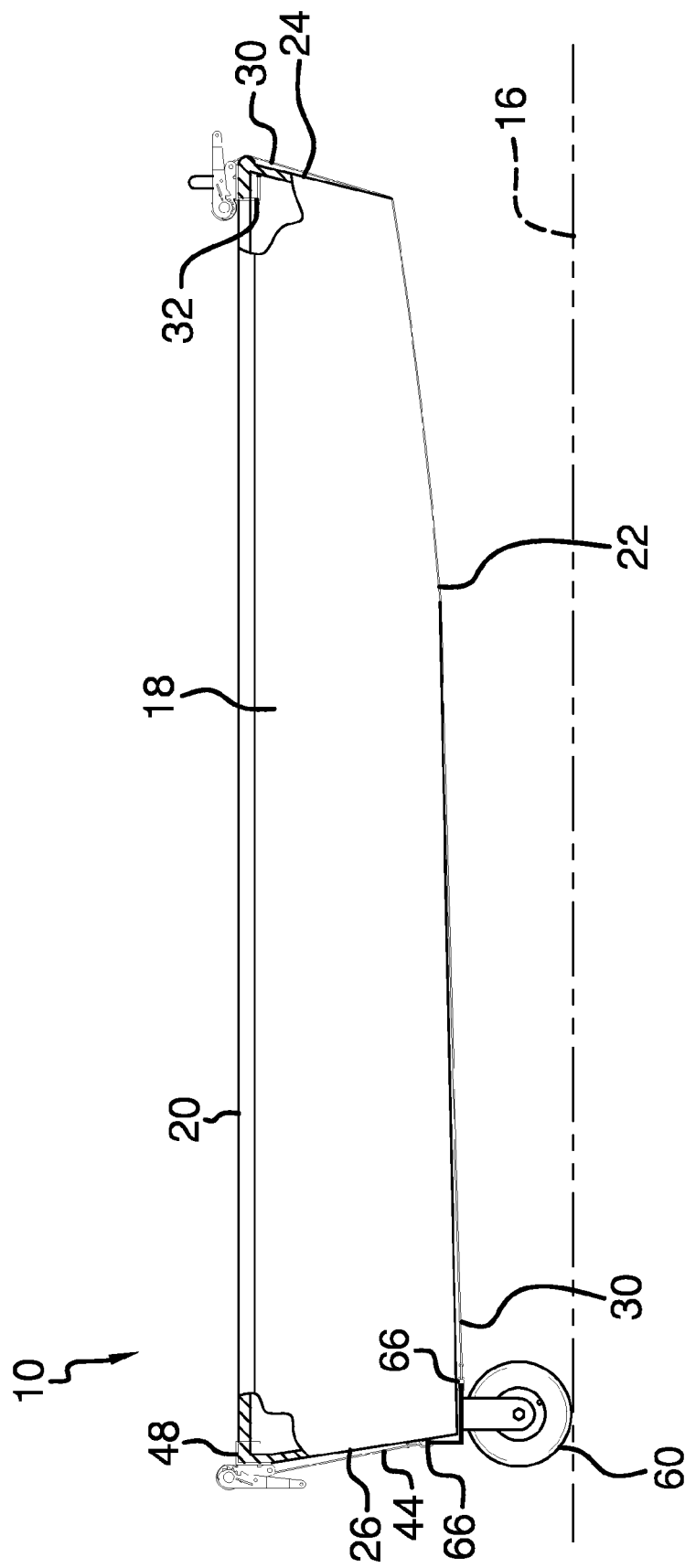
FIG. 5 is a side view of an embodiment of the disclosure.

As best illustrated in FIGS. 1 through 5, the boat dolly system 10 generally comprises a boat 18 or similar watercraft having a top end 20, a bottom end 22, a front end 24 and a rear end 26. A front mounting assembly 28 is provided and is shown in FIGS. 2, 4 and 5. The front mounting assembly 28 includes a pair of front straps 30. The front straps 30 are couplable to the front end 24 of the boat 18 and are extendable around the front end 24 and the bottom end 22 of the boat 18. A front mounting bracket 32 is attached to the top end 20 of the boat 18. The front straps 30 are coupled to the front mounting bracket 32. The front mounting bracket 32 may have a top wall 34, a bottom wall 36 and a medial wall 38 coupled to and extending between the top wall 34 and the bottom wall 36. The top wall 34 and the bottom wall 36 are spaced from each other and orientated parallel to each other and perpendicular to the medial wall 38. The front mounting bracket 32 may be constructed from a rigid material, such as plastic, recycled aluminum or the like. A handle 40 may be coupled to the front mounting bracket 32. The handle 40 may have a height between approximately 8.0 cm and 12.0 cm. A distance between the top wall 34 and the bottom wall 36 may be between approximately 3.0 cm and 10.0 cm. A distance from a rear edge 41 of the top wall 34 to a front edge 43 of the top wall 34 may measure between approximately 3.0 cm and 10.0 cm.

An upper rear mounting assembly 42 is provided and is shown in FIGS. 1, 3 and 5. The upper rear mounting assembly 42 includes a pair of rear straps 44. The rear straps 44 are couplable to the rear end 26 of the boat 18 and are extendable around the rear end 26 of the boat 18. Each of the front straps 30 and the rear straps 44 has an associated free end 46. A pair of upper rear mounting brackets 48 is couplable to the boat 18. Each of the rear straps 44 is coupled to an associated one of the upper rear mounting brackets 48. Each of the upper rear mounting brackets 48 is attached to the top end 20 of the boat 18. Each of the upper rear mounting brackets 48 may have a horizontal wall 50, a front wall 52 and a rear wall 54. The horizontal wall 50 is attached to and extends between the front wall 52 and the rear wall 54. The rear 54 and front 52 walls are spaced from each other and orientated parallel to each other and perpendicular to the horizontal wall 50. Each of the upper rear mounting brackets 48 may be constructed from a rigid material, such as plastic, recycled aluminum or the like. A plurality of ratcheting mechanisms 56 is provided with each being of conventional design. Each of the ratcheting mechanisms 56 is coupled to an associated one of the rear straps 44 and the front straps 30.

A lower rear mounting assembly 58 is provided and is shown in FIGS. 1 and 5. The lower rear mounting assembly 58 includes a pair of wheels 60 and a lower mounting bracket 62. The wheels 60 of the lower rear mounting assembly 58 are coupled to and extend downwardly from the lower mounting bracket 62. Each of the wheels 60 is inflatable. The lower mounting bracket 62 is couplable to the bottom end 22 of the boat 18 such that the wheels project downwardly from the bottom end 22 of the boat 18. Each of the front straps 30 and the rear straps 44 is couplable to the lower mounting bracket 62. A distance between opposite ends 63 of the lower mounting bracket 62 may measure between approximately 45.0 cm and 80.0 cm. The lower mounting bracket 62 may have a plurality of holes 64 positioned therein. The lower mounting bracket 62 may be constructed from a rigid material, such as plastic, recycled aluminum or the like. Each wheel 60 of the lower rear mounting assembly 58 may have an outer diameter between approximately 20.0 cm and 40.0 cm. The lower rear mounting assembly 58 may have a height between approximately 30.0 cm and 60.0 cm.

A plurality of fasteners 66 is provided. Each of the fasteners 66 is extendable through an associated one of the holes 64. A plurality of connectors 68 is provided. Each of the connectors 68 is attached to an associated one of the free ends 46.

Each of the connectors 68 is selectively engageable with an associated one of the fasteners 66 for releasably coupling each of the front straps 30 and the rear straps 44 to the lower rear mounting assembly 58.

In use, as stated above and shown in the Figures, the front mounting bracket 32 is attached to the top end 20 of the boat 18. The front straps 30 are extended around the front end 24 and the bottom end 22 of the boat 18 and are attached to the lower mounting bracket 62. The rear straps 44 are extended around the rear end 26 of the boat 18 and are also attached to the lower mounting bracket 62. The ratcheting mechanisms 56 are manipulated to adjust a length of each of the front straps 30 and the rear straps 44 to secure the wheels 60 to the bottom end 22 of the boat 18. The handle 40 is grasped in order to lift the front end 24 of the boat 18 off a trailer or the like and onto land so that the wheels 60 are placed onto a ground surface 16. The handle 40 is then used to push or pull the boat 18 toward a fishing hole such that the wheels 60 are rolled upon the ground surface 16. In this manner, the system 10 protects the bottom end 22 of the boat 18 while facilitating transportation of the boat 18 on the ground surface 16 toward a fishing hole. The wheels 60 may remain secured to the boat 18 even after the boat 18 is launched into the water. The inflatable nature of the wheels 60 protects the bottom end 22 of the boat 18 from scraping against a bottom surface of a body of water in areas of shallow water.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A boat dolly system comprising:
a boat having a top end, a bottom end, a front end and a rear end;
a pair of front straps, each of said front straps being couplable to said front end of said boat, each of said front straps being extendable around said front end and said bottom end of said boat;
a pair of rear straps, each of said rear straps being couplable to said rear end of said boat, each of said rear straps being extendable around said rear end of said boat;
a lower rear mounting assembly including at least one wheel and a lower mounting bracket, said at least one wheel of said lower rear mounting assembly being coupled to said lower mounting bracket, said lower mounting bracket being couplable to said bottom end of said boat, each of said front straps and said rear straps being couplable to said lower mounting bracket; and
a pair of upper rear mounting brackets being couplable to said boat, each of said rear straps being coupled to an associated one of said upper rear mounting brackets.

2. The system of claim 1, further comprising a plurality of ratcheting mechanisms, each of said ratcheting mechanisms being coupled to an associated one of said rear straps and said front straps.

3. The system of claim 1, further comprising a front mounting bracket, said front straps being coupled to said front mounting bracket.

4. The system of claim 1, further comprising a handle coupled to said front mounting bracket.

5. The system of claim 1, further comprising said lower mounting bracket having a plurality of holes positioned therein.

6. A boat dolly system comprising:
a boat having a top end, a bottom end, a front end and a rear end;
a pair of front straps, each of said front straps being couplable to said front end of said boat, each of said front straps being extendable around said front end and said bottom end of said boat;
a pair of rear straps, each of said rear straps being couplable to said rear end of said boat, each of said rear straps being extendable around said rear end of said boat;
a lower rear mounting assembly including at least one wheel and a lower mounting bracket, said at least one wheel of said lower rear mounting assembly being coupled to said lower mounting bracket, said lower mounting bracket being couplable to said bottom end of said boat, each of said front straps and said rear straps being couplable to said lower mounting bracket, said lower mounting bracket having a plurality of holes positioned therein; and
a plurality of fasteners, each of said fasteners being extendable through an associated one of said holes.

7. The system of claim 6, further comprising:
each of said front straps and said rear straps having an associated free end; and
a plurality of connectors, each of said connectors being attached to an associated one of said free ends, each of said connectors being selectively engageable with an associated one of said fasteners for releasably coupling each of said front straps and said rear straps to said lower rear mounting assembly.

8. The system of claim 1, further comprising said lower rear mounting assembly having two said wheels.

9. The system of claim 1, further comprising each said wheel being inflatable.

10. The system of claim 3, further comprising said front mounting bracket being attached to said top end of said boat.

11. The system of claim 1, further comprising each of said upper rear mounting brackets being attached to said top end of said boat.

12. The system of claim 1, further comprising each of said upper rear mounting brackets having a horizontal wall, a front wall and a rear wall, said horizontal wall being attached to and extending between said front wall and said rear wall, said front and rear walls being spaced from each other and orientated parallel to each other and perpendicular to said horizontal wall.

13. A boat dolly system comprising:
a boat having a top end, a bottom end, a front end and a rear end;

a pair of front straps, each of said front straps being couplable to said front end of said boat, each of said front straps being extendable around said front end and said bottom end of said boat;

a pair of rear straps, each of said rear straps being couplable to said rear end of said boat, each of said rear straps being extendable around said rear end of said boat;

a lower rear mounting assembly including at least one wheel and a lower mounting bracket, said at least one wheel of said lower rear mounting assembly being coupled to said lower mounting bracket, said lower mounting bracket being couplable to said bottom end of said boat, each of said front straps and said rear straps being couplable to said lower mounting bracket; and a front mounting bracket, said front straps being coupled to said front mounting bracket, said front mounting bracket having a top wall, a bottom wall and a medial wall coupled to and extending between said top wall and said bottom wall, said top wall and said bottom wall being spaced from each other and orientated parallel to each other and perpendicular to said medial wall.

14. The system of claim 1, further comprising:

a front mounting bracket being attached to said top end of said boat, said front straps being coupled to said front mounting bracket, said front mounting bracket having a top wall, a bottom wall and a medial wall coupled to and extending between said top wall and said bottom wall, said top wall and said bottom wall being spaced from each other and orientated parallel to each other and perpendicular to said medial wall;

a handle coupled to said front mounting bracket;

each of said front straps and said rear straps having an associated free end;

each of said upper rear mounting brackets being attached to said top end of said boat, each of said upper rear mounting brackets having a horizontal wall, a front wall and a rear wall, said horizontal wall being attached to and extending between said front wall and said rear wall, said front and rear walls being spaced from each other and orientated parallel to each other and perpendicular to said horizontal wall;

a plurality of ratcheting mechanisms, each of said ratcheting mechanisms being coupled to an associated one of said rear straps and said front straps;

said lower rear mounting assembly including a pair of said wheels, said wheels of said lower rear mounting assembly being coupled to and extending downwardly from said lower mounting bracket, each of said wheels being inflatable, said lower mounting bracket having a plurality of holes positioned therein;

a plurality of fasteners, each of said fasteners being extendable through an associated one of said holes; and a plurality of connectors, each of said connectors being attached to an associated one of said free ends, each of said connectors being selectively engageable with an associated one of said fasteners for releasably coupling each of said front straps and said rear straps to said lower rear mounting assembly.

\* \* \* \* \*